United States Patent
Kawaguchi

(10) Patent No.: US 10,299,170 B2
(45) Date of Patent: May 21, 2019

(54) GATEWAY APPARATUS, COMMUNICATION CONTROL METHOD, AND NON-TRANSITORY COMPUTER READABLE MEDIUM STORING COMMUNICATION CONTROL PROGRAM

(71) Applicant: NEC Corporation, Minato-ku, Tokyo (JP)

(72) Inventor: Kenji Kawaguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/822,409

(22) Filed: Nov. 27, 2017

(65) Prior Publication Data

US 2018/0077611 A1    Mar. 15, 2018

Related U.S. Application Data

(63) Continuation of application No. 13/255,998, filed as application No. PCT/JP2010/001881 on Mar. 16, 2010, now Pat. No. 9,860,793.

(30) Foreign Application Priority Data

Apr. 20, 2009  (JP) .................. 2009-102034

(51) Int. Cl.
*H04W 36/00* (2009.01)
*H04W 28/06* (2009.01)
(Continued)

(52) U.S. Cl.
CPC ........ *H04W 36/0011* (2013.01); *H04W 28/06* (2013.01); *H04W 36/10* (2013.01); *H04W 84/045* (2013.01)

(58) Field of Classification Search
CPC ............. H04W 36/0022; H04W 36/14; H04W 36/0066; H04W 36/0055; H04W 36/08;
(Continued)

(56) References Cited

U.S. PATENT DOCUMENTS 6,473,411 B1   10/2002  Kumaki et al.
7,016,321 B1    3/2006  Park et al.
(Continued)

FOREIGN PATENT DOCUMENTS

EP    1107633 A1    6/2001
EP    2040481 A1    3/2009
(Continued)

OTHER PUBLICATIONS

International Search Report for PCT Application No. PCT/JP2010/001881, dated Apr. 20, 2010.
(Continued)

*Primary Examiner* — Wutchung Chu

(57) ABSTRACT

A source Home Node B (HNB) of a mobile communication system transmits, to a Home Node B-Gateway (HNB-GW) of the mobile communication system, a Direct Transfer message including a Target Radio Network Controller (RNC)-ID and a Target Cell ID. A mobile station receives a channel reconfiguration message from the source HNB, synchronizes with the target HNB, and transmits a channel reconfiguration complete message to the target HNB. The HNB-GW constructs a RANAP relocation request message using the Target RNC-ID. The HNB-GW transmits the RANAP relocation request message to the target HNB, and detects a relocation from the source HNB to the target HNB, after receiving the Direct Transfer message from the source HNB.

12 Claims, 7 Drawing Sheets

(51) Int. Cl.
*H04W 36/10* (2009.01)
*H04W 84/04* (2009.01)

(58) Field of Classification Search
CPC ......... H04W 36/0033; H04W 36/0044; H04W 36/30; H04W 36/0083; H04W 36/10; H04W 36/0016; H04W 36/12; H04W 36/0011; H04W 28/06; H04W 84/045
USPC ....... 455/436, 437, 438, 439, 440, 442, 443, 455/449, 456; 370/310, 331, 332, 401
See application file for complete search history.

(56) References Cited

U.S. PATENT DOCUMENTS

| | | | |
|---|---|---|---|
| 7,171,215 B2 | 1/2007 | Khouaja et al. | |
| 7,826,423 B2 | 11/2010 | Kim et al. | |
| 7,894,338 B2 | 2/2011 | Ljung et al. | |
| 8,041,335 B2* | 10/2011 | Khetawat | H04L 63/104 455/404.2 |
| 8,073,446 B2 | 12/2011 | Shii et al. | |
| 8,611,308 B2* | 12/2013 | Wang | H04W 36/0033 370/331 |
| 8,761,772 B2* | 6/2014 | Shindo | H04W 36/08 455/436 |
| 8,768,364 B2* | 7/2014 | Kawaguchi | H04W 36/0061 370/331 |
| 9,510,247 B2* | 11/2016 | Mochizuki | H04W 36/0055 |
| 2002/0009070 A1 | 1/2002 | Lindsay et al. | |
| 2002/0101941 A1 | 8/2002 | Myers | |
| 2002/0136226 A1 | 9/2002 | Christoffel et al. | |
| 2003/0036387 A1 | 2/2003 | Kovacs et al. | |
| 2003/0104815 A1 | 6/2003 | Lee | |
| 2004/0052241 A1 | 3/2004 | Martin et al. | |
| 2004/0106433 A1 | 6/2004 | Ooki et al. | |
| 2004/0122976 A1 | 6/2004 | Dutta et al. | |
| 2004/0180660 A1 | 9/2004 | Choi et al. | |
| 2004/0260430 A1 | 12/2004 | Mansingh et al. | |
| 2005/0026626 A1 | 2/2005 | Carl et al. | |
| 2005/0268150 A1 | 12/2005 | Llabres et al. | |
| 2006/0291424 A1 | 12/2006 | Park et al. | |
| 2007/0086378 A1 | 4/2007 | Matta et al. | |
| 2007/0213060 A1* | 9/2007 | Shaheen | H04W 36/10 455/436 |
| 2007/0249344 A1 | 10/2007 | Hosono et al. | |
| 2007/0298800 A1 | 12/2007 | Williams et al. | |
| 2008/0076441 A1 | 3/2008 | Zhou | |
| 2008/0084846 A1 | 4/2008 | Watanabe et al. | |
| 2008/0112353 A1 | 5/2008 | Ljung et al. | |
| 2008/0132239 A1* | 6/2008 | Khetawat | H04W 36/12 455/438 |
| 2008/0132240 A1* | 6/2008 | Baek | H04W 36/026 455/442 |
| 2008/0205345 A1 | 8/2008 | Sachs et al. | |
| 2008/0268848 A1 | 10/2008 | Tomoe et al. | |
| 2008/0311911 A1 | 12/2008 | Koodli et al. | |
| 2008/0311914 A1 | 12/2008 | Tinnakornsrisuphap et al. | |
| 2009/0036129 A1 | 2/2009 | Harada et al. | |
| 2009/0040982 A1 | 2/2009 | Ho et al. | |
| 2009/0061878 A1 | 3/2009 | Fischer | |
| 2009/0104910 A1 | 4/2009 | Lee et al. | |
| 2009/0180437 A1 | 7/2009 | Kanazawa | |
| 2009/0213810 A1 | 8/2009 | Shousterman et al. | |
| 2009/0219896 A1 | 9/2009 | Hakuli et al. | |
| 2009/0265543 A1* | 10/2009 | Khetawat | H04L 63/104 713/151 |
| 2009/0296655 A1 | 12/2009 | Tamura | |
| 2009/0296659 A1 | 12/2009 | Lim et al. | |
| 2009/0316655 A1 | 12/2009 | Prakash et al. | |
| 2010/0040017 A1 | 2/2010 | Shin et al. | |
| 2010/0041405 A1* | 2/2010 | Gallagher | H04W 8/02 455/436 |
| 2010/0113024 A1 | 5/2010 | Wu | |
| 2010/0142367 A1 | 6/2010 | Zhang et al. | |
| 2010/0157944 A1 | 6/2010 | Horn | |
| 2010/0195621 A1 | 8/2010 | Kekki et al. | |
| 2010/0210268 A1 | 8/2010 | Lim et al. | |
| 2010/0246530 A1 | 9/2010 | Pehrsson et al. | |
| 2010/0261473 A1 | 10/2010 | Al-Bakri et al. | |
| 2010/0267373 A1 | 10/2010 | Stefan Engstroem | |
| 2010/0297998 A1 | 11/2010 | Hapsari et al. | |
| 2010/0323705 A1 | 12/2010 | Iwamura et al. | |
| 2011/0164590 A1 | 7/2011 | Wang et al. | |
| 2011/0243096 A1 | 10/2011 | Brandt et al. | |
| 2011/0305221 A1* | 12/2011 | Wang | H04W 36/0033 370/331 |
| 2012/0015660 A1* | 1/2012 | Kawaguchi | H04W 36/0061 455/438 |
| 2012/0020346 A1* | 1/2012 | Ganapathy | H04W 36/0033 370/338 |
| 2012/0142353 A1* | 6/2012 | Jha | H04W 36/0038 455/436 |
| 2012/0252457 A1* | 10/2012 | Shindo | H04W 36/08 455/436 |

FOREIGN PATENT DOCUMENTS

| | | |
|---|---|---|
| EP | 2068507 A1 | 6/2009 |
| EP | 2654343 A1 | 10/2013 |
| JP | 2000-083273 A | 3/2000 |
| JP | 2008-263632 A | 10/2008 |
| JP | 2009-510871 A | 3/2009 |
| KR | 20080051064 A | 6/2008 |

OTHER PUBLICATIONS

Mitsubishi Electric, Addressing Options for S1 inter-HeNB Handovers, 3GPP TSG RAN WG3 Meeting #63bis, R3-090767, Mar. 26, 2009.
Ericsson, S1-handover routing with HeNB Gateway, 3GPP TSG RAN WG3 Meeting #61, R3-082219, Aug. 22, 2008.
3GPP TS 25A67 V8.1.0, Technical Specification Group Radio Access Network; UTRAN architecture for 3G Home NodeB; Stage 2(Release 8), Mar. 2009, pp. 8-11.
Korean Office Action for KR10-2011-7024533 dated Dec. 11, 2012.
European Search Report for EP Application No. 10766775.0 dated Apr. 15, 2015.
3GPP TSG RAN WG3 Meeting RAN3 Adhoc Jun. 8, "RNC identifier and relocation function", RJ-081630, Agenda Item: 6.2.6, Source: Panasonic, Jun. 11-12, 2008, Sophia Antipolis, France.
3GPP TSG-RAN WG3 Meeting# 63bis, "Handover procedure between HNBs", R3-090759, Agenda item: 12.2, Source: ZTE, Mar 23-26,2009, South Korea.
3GPP TSG-RAN WG3 Meeting#63bis, "Discussion on Inbound Mobility from HNB to HNB", R3-090803, Agenda item: 12.2, Source: Huawei, Mar. 23-26, 2008, Seoul, Korea.
3GPP TSG RAN WG3 Meeting #63bis, "3G HNB to 3G HNB Handover", R3-090856, Agenda item: 12.2, Source: Samsung, Mar. 23-26, 2009, Seoul, Korea.

* cited by examiner

| HNB | RNC ID | Cell ID |
|---|---|---|
| 20 | 211 | Cell:AA |
| 21 | 211 | Cell:BB |

Fig. 3

GATEWAY APPARATUS, COMMUNICATION CONTROL METHOD, AND NON-TRANSITORY COMPUTER READABLE MEDIUM STORING COMMUNICATION CONTROL PROGRAM

REFERENCE TO RELATED APPLICATION

The present application is a continuation application of U.S. patent application Ser. No. 13/255,998 filed on Sep. 12, 2011, which is a National Stage Entry of international application PCT/JP2010/001881, filed Mar. 16, 2010, which claims the benefit of priority from Japanese Patent Application 2009-102034 filed on Apr. 20, 2009, the disclosures of all of which are incorporated in their entirety by reference herein.

TECHNICAL FIELD

The present invention relates to a gateway apparatus, a communication control method, a communication control program, and in particular, change control of a base station.

BACKGROUND ART

A base station that is installed inside user's house of a cellular communication service (mobile phone service) is usually called "femto base station", "femto-cell base station", or "home base station". Further, a small-scale cell formed by a femto base station is called "femto cell". In contrast to this, a cell formed by a base station that covers a wide area ranging from several hundred meters to several dozen kilometers in a cellular communication service is called "macro cell". In a service using femto base stations, when a user using a mobile phone is out of his/her house, the mobile phone communicates with a base station forming a macro cell. When the user has returned to his/her house, the mobile phone communicates with a femto base station in a femto cell formed within the house. Note that a cellular communication service usually provides a mobility function. Therefore, even when a mobile phone user is traveling, the user can continue the communication without interruption by changing the base station with which the mobile phone communicates. Similarly, the mobile phone has such a mobility function that even when the user moves from a macro cell to a femto cell, the mobile phone can change the base station with which the mobile phone communicates to the femto base station without interruption.

Note that, in general, a mobile communication system used for a cellular communication service is composed of, at least, a mobile device, a plurality of radio base stations, a base station control station that controls the plurality of base stations, and a core network apparatus that is wire-connected to the base stations control station. The mobility function implements the following two functions depending on the form of transfer of the mobile communication system. A first function is the so-called "soft handover". In this soft handover, when a mobile device moves from the cell of one radio base station to the cell of another radio base station and these two radio base stations are managed by the same base station control station, the handover is carried out by changing only the radio base station without changing the base station control station. Further, even when two base stations are managed by different base station control stations, the base station control station that has been controlling the base station at the original place can manage the base station at the destination place by connecting the base station control station controlling the original base station with the base station control station controlling the destination base station by using a subscriber line extension technique, and thus requiring substantially no change of the base station control station.

Meanwhile, a second function is the so-called "hard handover". This hard handover is used when the base station control station does not use the subscriber line extension technique, i.e., when the communication system does not have any interface connecting base station control stations with one another. In this case, different base station control stations are used before and after the transfer of the mobile device under control of the upper-layer node of the base station control stations. This control is also called "relocation".

A network configuration in which a relocation is carried out is explained hereinafter with reference to FIG. 7. The system shown in FIG. 7 includes NodeBs 71 to 72, which are base stations, base station control stations (RNCs: Radio Network Controllers) 61 to 62, and a core network apparatus (CN: Core Network) 51, which is an upper-layer station. The NodeB 71 forms a cell 81 and the NodeB 72 forms a cell 82.

The RNC 61 is assigned with an RNC ID (RNC ID_61). Further, the RNC 62 is assigned with an RNC ID (RNC ID_62). When a mobile device moves from the cell 81 to the cell 82, the RNC 61 identifies the cell at the transfer destination as the cell 82 and also identifies the RNC 62 that is managing the transfer destination cell according to information notified from the mobile device. The RNC 61 notifies the CN 51 that the mobile device has moved to the network managed by the RNC 62. Then, the CN 51 establishes a data communication path between the mobile device and the RNC 62, thereby completing the transfer of the mobile device.

When communication using femto cells is carried out, there is no I/F between femto base stations and between femto base station control stations. Therefore, in order to carry out the mobility control, it is necessary to carry out a relocation (hard handover) process. Accordingly, as femto cells have become more widespread, the demand for efficient relocation processes is growing.

Patent literature 1 discloses a transfer method from a femto cell in which communication is permitted to a femto cell in which communication is not permitted. In this case, the base station control station that manages the femto cell in which communication is not permitted refuses the handover and the mobile device, which is refused the handover, continues to communicate to the limit of the reception power level in the currently-located femto cell.

CITATION LIST

Patent Literature

Patent literature 1: Japanese Unexamined Patent Application Publication No. 2008-263632

SUMMARY OF INVENTION

Technical Problem

A typical system configuration in which a mobile device moves from a femto cell where communication is permitted to another femto cell where communication is permitted is explained hereinafter with reference to FIG. 8. The system shown in FIG. 8 includes HNBs (Home NodeBs) 101 to 104 representing femto base stations, HNB-GWs (Home NodeB Gateways) 91 to 92 that connect the plurality of femto base stations, and a core network apparatus (CN) 51, which is the upper-layer station of the HNB-GWs 91 to 92. Assume that the HNB-GWs 91 to 92 have a function of assigning an identifier (RNC-ID) of the base station control station (RNC) that controls the HNBs. Note that an RNC ID is assigned to each HNB-GW. Therefore, since the same RNC ID is used within one HNB-GW, the same RNC ID is assigned to both of the HNBs 101 and 102. Similarly, the same RNC ID is assigned to both of the HNBs 103 and 104.

In this case, when a mobile device moves from the HNB 101 to the HNB 102, a relocation process is carried out. However, the same RNC ID is assigned to the HNBs 101 and 102. This causes a problem that since a relocation process is carried out by using different RNC IDs, the relocation process cannot be properly carried out when a mobile device moves between HNBs that are managed by the same HNB-GW. Further, this problem is not limited to network configurations using femto cells, but also arises in network configurations in which the mobility is implemented by using a hard handover function.

The present invention has been made to overcome the problem like this, and an object thereof is to provide a gateway apparatus, a communication control method, and a non-transitory computer readable medium storing a communication control program, capable of implementing a hard handover between base stations that are controlled by the same base station control station.

Solution to Problem

A gateway apparatus according to a first aspect of the present invention is a gateway apparatus disposed between a plurality of base stations and a core network, including: a receiving unit that receives, in response to a start of a location change of a mobile station from a cell managed by a first base station included in the plurality of base stations to another cell, a location change message including a transfer destination identifier indicating a base station control apparatus associated with a second base station managing the another cell from the first base station; and a transmitting unit that determines whether the massage is to be transmitted to one of the plurality of base stations managed by the gateway apparatus itself or to the core network based on whether the transfer destination identifier matches an identifier of a base station control apparatus collectively associated with the plurality of base stations, and transmits the massage to the determined transmission destination.

A base station control method according to a second aspect of the present invention is a communication control method for performing communication control between a plurality of base stations and a core network, the communication control method including: a step of receiving, in response to a start of a location change of a mobile station from a cell managed by a first base station included in the plurality of base stations to another cell, a location change message including transfer destination identifier indicating a base station control apparatus associated with a second base station managing the another cell from the first base station; and a step of determining whether the massage is to be transmitted to the second base station or to the core network based on whether the transfer destination identifier matches an identifier of a base station control apparatus collectively associated with the plurality of base stations.

A non-transitory computer readable medium storing a communication control program according to a third aspect of the present invention is a communication control program in a gateway apparatus disposed between a plurality of base stations and a core network, the communication control program causing a computer to execute: a step of determining, based on whether a transfer destination identifier that is transmitted in response to a start of a location change of a mobile station from a cell managed by a first base station included in the plurality of base stations to another cell and indicates a base station control apparatus associated with a second base station managing the another cell matches an identifier of a base station control apparatus collectively associated with the plurality of base stations, whether the massage is to be transmitted to one of the plurality of base stations or to the core network.

Advantageous Effects of Invention

According to the present invention, it is possible to provide a gateway apparatus, a communication control method, and a non-transitory computer readable medium storing a communication control program, capable of implementing a hard handover between base stations that are controlled by the same base station control station.

BRIEF DESCRIPTION OF DRAWINGS

FIG. 3 shows an information table held by a gateway apparatus according to a first exemplary embodiment;

DESCRIPTION OF EMBODIMENTS

First Exemplary Embodiment

Figure 1:
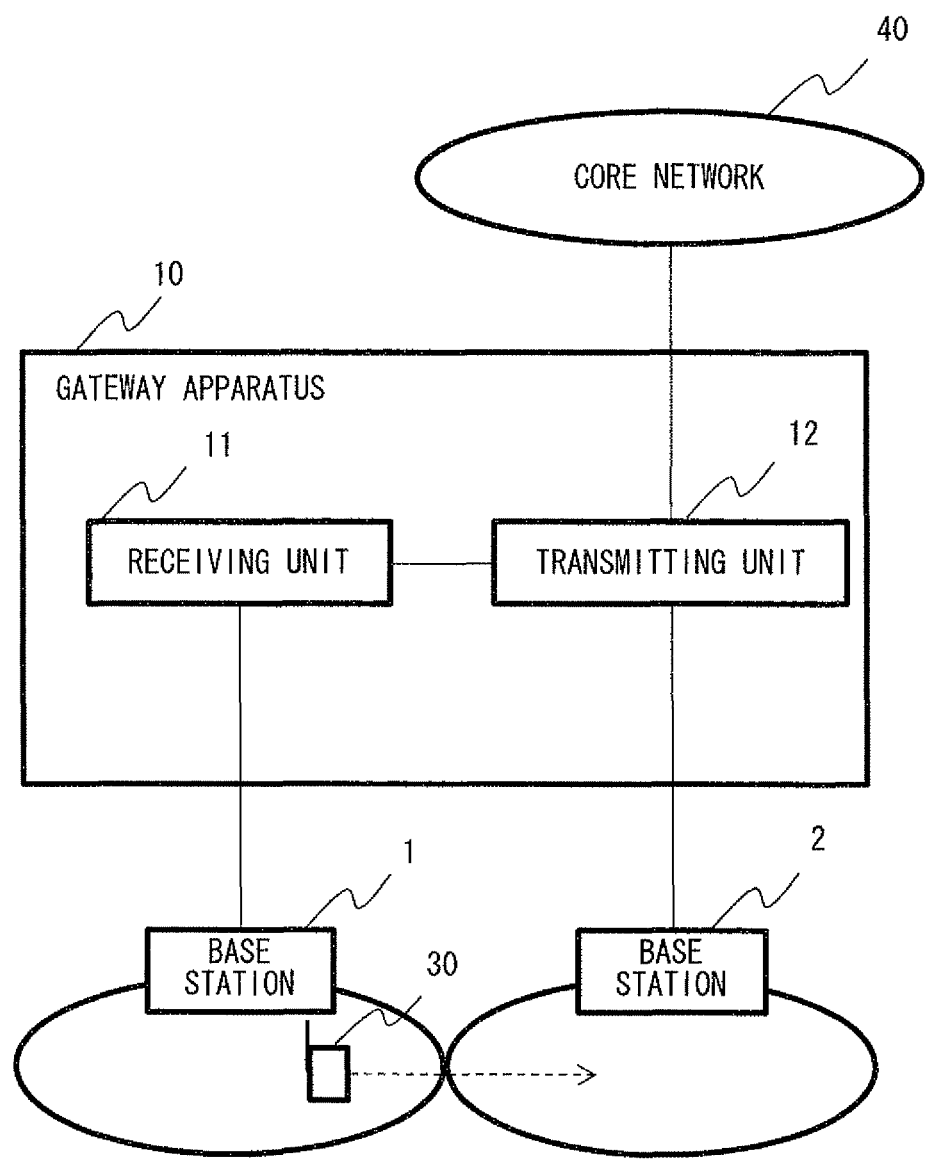
FIG. 1 is a configuration diagram of a gateway apparatus according to a first exemplary embodiment.

Exemplary embodiments of the present invention are explained hereinafter with reference to the drawings. FIG. 1 shows a configuration of a gateway apparatus according to a first exemplary embodiment of the present invention. A gateway apparatus 10 includes a receiving unit 11 and a transmitting unit 12. Further, the gateway apparatus 10 are connected to a base station 1 and a base station 2, and to a core network 40. FIG. 1 shows a case where a mobile station 30 moves from a cell formed by the base station 1 to another cell formed by the base station 2.

The receiving unit 11 acquires a location change massage including a transfer destination identifier indicating a base station control apparatus associated with the base station 2 in response to the start of a location change of the mobile station 30 from the cell managed by the base station 1 to the cell managed by the base station 2. Note that the base station control apparatus represents a gateway apparatus.

The transmitting unit 12 transmits a location change massage to the base station 2 managing the cell to which the mobile station 30 moves when the transfer destination identifier received by the receiving unit 11 matches the identifier of the base station control apparatus that is collectively associated with a plurality of base stations managed by the gateway apparatus 10. When the transfer destination identifier received by the receiving unit 11 does not match the identifier of the base station control apparatus collectively associated with the plurality of base stations managed by the gateway apparatus 10, the transmitting unit 12 transmits the location change massage to the core network.

With the configuration of the gateway apparatus shown in FIG. 1, even when the mobile station moves between base stations having the same base station control apparatus identifier, it is possible to recognize that the mobile station moves between the base stations that are managed by the same gateway apparatus, and thereby enabling the relocation process to be carried out.

Figure 2:
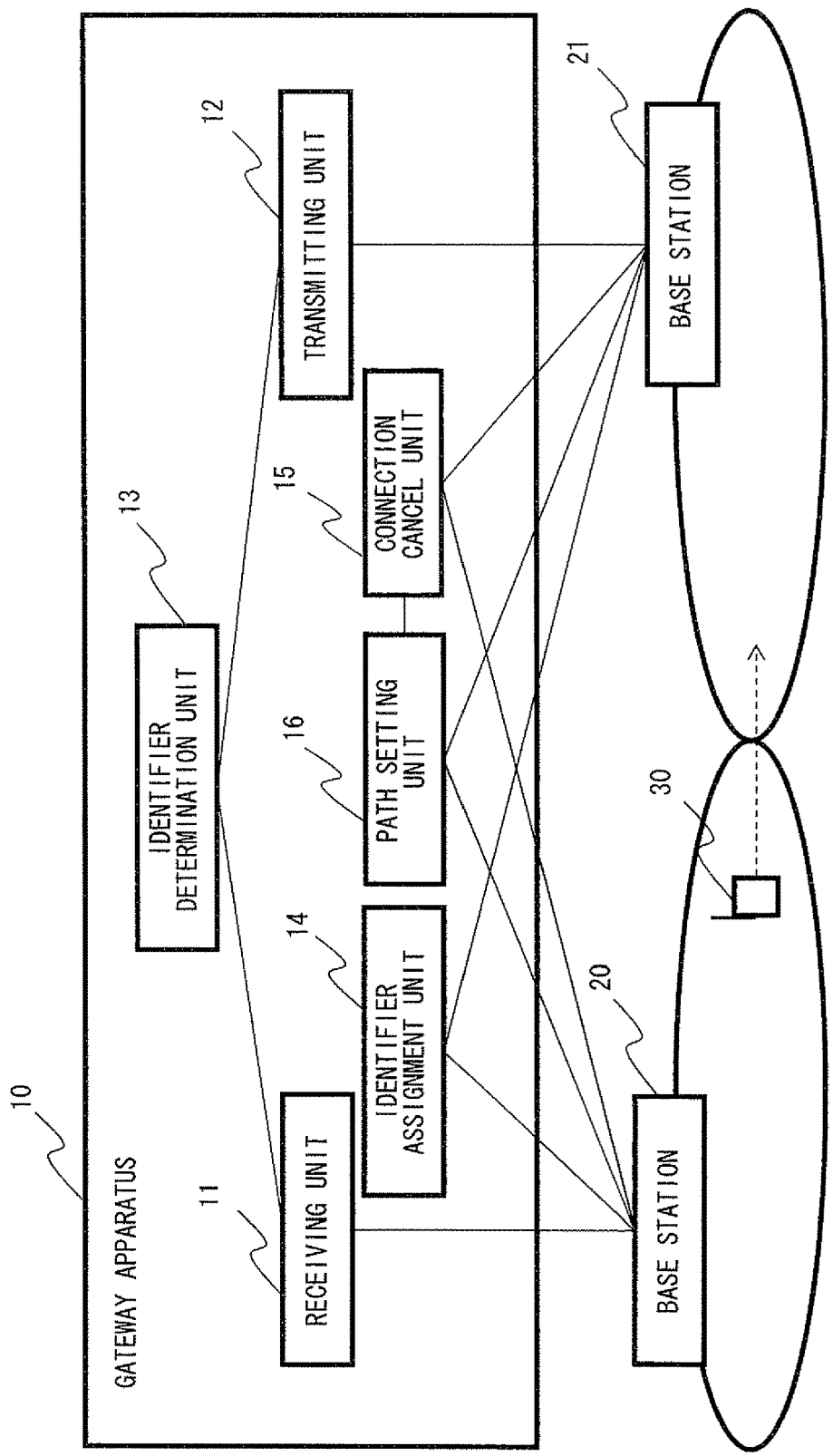
FIG. 2 is a configuration diagram of a gateway apparatus according to a first exemplary embodiment.

Next, a configuration of the gateway apparatus according to the first exemplary embodiment of the present invention is explained in detail with reference to FIG. 2.

The gateway apparatus (hereinafter called "HNB (Home NodeB)-GW (Gateway)") 10 includes a receiving unit 11, a transmitting unit 12, an identifier determination unit 13, an identifier assignment unit 14, a connection cancel unit 15, and a path setting unit 16. Further, the HNB-GW is an apparatus that connects to a plurality of base stations (hereinafter called "femto base stations: HNBs (Home NodeBs)") installed inside the house of a cellular communication user. In FIG. 2, the HNB-GW 10 connects to HNBs 20 and 21. Further, FIG. 2 shows a case where a mobile station 30 moves from a cell formed by the HNB 20 to another cell formed by the HNB 21.

Note that the HNBs 20 and 21 have a radio line control function for establishing or releasing a radio line established between the mobile station 30 and the HNB 20 or 21.

The identifier assignment unit 14 assigns the same identifier to the HNBs 20 and 21. Specifically, the same base station control apparatus identifier (hereinafter called "RNC-ID") is assigned to all of the HNBs connected to the same identifier assignment unit 14. That is, the same RNC-ID is assigned to the HNBs 20 and 21. Therefore, the same RNC-ID is assigned to all of the femto base stations connected to the same gateway apparatus.

When the HNB 20 detects that the location of the mobile station 30 is changed from a cell managed by the HNB 20 to a cell managed by the HNB 21, the receiving unit 11 receives a location change massage including an RNC-ID associated with the HNB 21 from the HNB 20. The receiving unit 11 outputs the obtained RNC-ID to the identifier determination unit 13.

Note that the HNB 20 collects network information of adjacent cells (hereinafter called "Global Cell IDs") and generates a list of adjacent cells. Note also that the HNB 20 may also collect RNC-IDs associated with the Global Cell IDs of the adjacent cells together with the Global Cell IDs. In this way, the HNB 20 can notify the RNC-ID assigned to the HNB 21 to the receiving unit 11.

The identifier determination unit 13 includes a control computer (e.g., a microprocessor unit) that operates based on a communication control program. The identifier determination unit 13 determines whether or not the RNC-ID of the HNB 21 received by the receiving unit 11 is the same as the RNC-ID of the HNB 20. The HNB-GW 10 holds an information table shown in FIG. 3. Specifically, the HNB-GW 10 holds an information table listing HNBs, RNC-IDs, and Cell-IDs in a mutually-associated manner. "HNB" is used to identify femto base stations, and includes information representing the HNBs 20 and 21. "RNC-ID" represents RND-IDs to which the HNBs 20 and 21 are assigned. In this example, since the assignment is made by the same HNB-GW 10, they indicate the same RNC-ID. In the example shown in FIG. 2, the RNC-IDs are represented as "211". "Cell-ID" includes IDs identifying areas formed by the HNBs 20 and 21. In the example shown in FIG. 2, the area formed by the HNB 20 is represented as "Cell#AA" and the area formed by the HNB 21 is represented as "Cell#BB".

In the first exemplary embodiment of the present invention, the identifier determination unit 13 can determine that the RNC-IDs of the HNBs 20 and 21 are the same as each other, and thereby determine that both of the HNBs 20 and 21 are femto base stations that are connected to and managed by the HNB-GW 10. That is, the identifier determination unit 13 can determine that the mobile station 30 has moved between cells that are managed by the same HNB-GW. The identifier determination unit 13 outputs the determination result to the transmitting unit 12.

When the transmitting unit 12 obtains a determination result indicating that the RNC-IDs of the HNBs 20 and 21 are the same as each other from the identifier determination unit 13, the transmitting unit 12 transmits a location change massage to the HNB 21 forming the cell to which the mobile station 30 has moved. Note that since the HNBs 20 and 21 have the same RNC-ID, the HNB-GW 10 is not changed due to the transfer of the mobile station 30. Therefore, the identifier determination unit 13 does not notify any location change to the core network, which is the upper-layer station of the gateway apparatus.

The connection cancel unit 15 disconnects the connection to the HNB 20, which is the femto base station at which the mobile station was originally located. Specifically, when the mobile station 30 receives a completion notification, which is notified when the transfer to the cell formed by the HNB 21 has been completed, the connection cancel unit 15 releases the Iu-h interface connection between the HNB-GW 10 and the HNB 20.

When the connection between the HNB-GW 10 and the original femto base station is released by the connection cancel unit 15, the path setting unit 16 establishes a path between the HNB 21 and the HNB-GW so that data transmitted from the core network is output to the mobile station 30.

Figure 4:
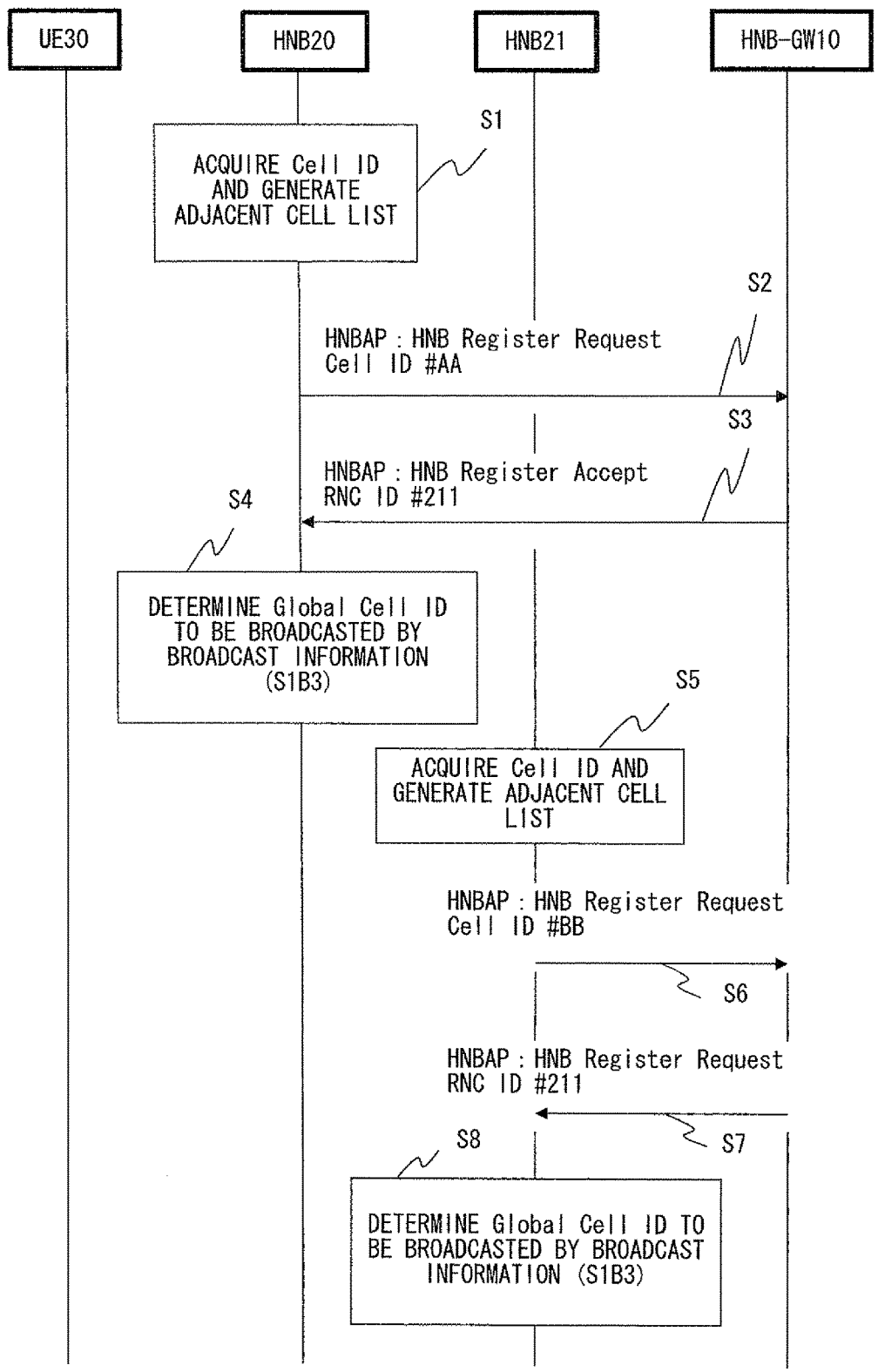
FIG. 4 shows a sequence with regard to a registration procedure of a femto base station according to a first exemplary embodiment.

Next, transmission/reception of signals between apparatuses is explained with reference to FIGS. 4 to 6. FIG. 4 shows transmission/reception of signals performed when the HNBs 20 and 21 are installed inside a house or the like.

Firstly, the HNB 20 acquires a Cell ID from a femto management server (not shown). The Cell ID is used to identify an area formed by the HNB 20. Further, the HNB 20 collects network information (Global Cell IDs) of adjacent cells by monitoring the surrounding environments, and thereby generates a list of adjacent cells that is used by the HNB 20 (S1). Note that when the HNB 20 collects network information of adjacent cells, the HNB 20 may also acquire RND-IDs associated with the Global Cell IDs. In this way, the HNB 20 can obtain information about the base station control stations and the gateway apparatus controlling the adjacent HNBs.

Next, the HNB 20 notifies the assigned Cell ID to the HNB-GW 10 and requests the HNB-GW 10 to register the HNB 20 as a new HNB (S2). Specifically, the HNB 20 notifies the Cell ID by using an HNBAP (HNB Application Part): HNB Register Request massage. Assume that the Cell ID is "Cell ID#AA" in this example. Note that the HNBAP massage is a message that is terminated between the HNB and the HNB-GW.

Next, the HNB-GW 10 permits the registration if the HNB can be registered without causing any program. Further, the HNB-GW 10 notifies an RNC-ID that is used in the mobility function to the HNB 20 (S3). Specifically, "HNB that can be registered without causing any program" means that the HNB has been permitted in advance to be installed inside the house of a cellular communication user. Further, the RNC-ID is notified to the HNB 20 by using a HNBAP: HNB Register Accept message. Assume that the RNC-ID is "RNC-ID#211" in this example.

Next, the HNB 20 generates a Global Cell ID to be set in broadcast information by using the RNC-ID notified from the HNB-GW 10 and the Cell ID obtained from the femto management server. Specifically, the broadcast information is used to broadcast, in advance, information necessary to establish a connection to a mobile communication system or necessary during the connection and/or information about other systems. Note that broadcast information in an IMT-2000 system is composed of a master information block (MIB) and a dependent system information block (SIB). Each of the MIB and SIB is composed of a plurality of blocks. For example, the Global Cell ID may be set in the SIB3 (third block in SIB).

Next, the HNB 21 performs similar procedures (S5 to S8) to those of the steps S1 to S4.

By performing the processes shown in FIG. 4, the registrations of the HNBs 20 and 21 have been completed under the HNB-GW 10. As a result, the HNBs 20 and 21 can transmit radio waves and thereby start providing a service. As a result, the HNB-GW 10 holds the information table shown in FIG. 3.

Next, a mobility procedure between femto cells according to the first exemplary embodiment of the present invention is explained with reference to FIGS. 5 and 6. In this procedure, it is assumed that the mobile station 30 moves from a cell formed by the HNB 20 to a cell formed by the HNB 21.

Firstly, the mobile station (hereinafter also called "UE (User Equipment)") 30 notifies information indicating the quality of communication with nearby cells to the HNB 20 (S9). Specifically, the mobile station 30 notifies information about cells with which the UE 30 has already established radio links and radio quality in the adjacent cells to the HNB 20 by using a Measurement Report according to RRC (Radio Resource Control) protocol. The RRC is a protocol that is used to control a radio line between a UE and an HNB, and is a protocol mainly used in a W-CDMA scheme of an IMT-2000 system.

Next, the HNB 20 determines the optimal transfer destination cell for the UE 30 based on the acquired radio quality in the adjacent cells. Further, the HNB 20 identifies the RNC ID assigned to the base station forming the transfer destination cell based on the adjacent cell list listing RNC IDs and Cell-IDs in a mutually-associated manner (S10). Note that the identifier of the transfer destination cell is referred to as "Target Cell ID" and the identifier assigned to the transfer destination base station is referred to as "Target RNC-ID".

Next, the HNB 20 notifies the Target RNC-ID and the Target Cell ID to the HNB-GW 10 (S11). Specifically, the HNB 20 notifies them to the HNB-GW 10 by using an RUA (RANAP User Adaption): Direct Transfer (RANAP (Radio Access Network Application Part): Relocation Required) massage. The RANAP is a protocol that is used to control communication between a radio network and a core network. Specifically, it is used to control communication between an HNB and a core network apparatus. In a system using a femto cell, a relocation process is carried out when a UE moves between HNBs. Therefore, the HNB 20 transmits an RUA massage to transmit the message to the core network apparatus that performs the switching control of base station control stations (HNB-GWs in the first exemplary embodiment).

Next, since the Target RNC-ID set in the obtained RUA: Direct Transfer (RANAP: Relocation Required) massage is the same as the RNC-ID assigned by the identifier assignment unit 14 of the HNB-GW 10, the HNB-GW 10 detects that the Target Cell is a cell managed by the HNB-GW 10 (S12).

Next, if it is an ordinary relocation process, the HNB-GW 10 transfers the RUA massage to the core network apparatus, which is the upper-layer node. This is because the change control of base station control stations having different RNC-IDs needs to be performed in the core network apparatus. However, upon detecting that the Target Cell is a cell managed by the HNB-GW 10, the HNB-GW 10 notifies the HNB 21 that the UE 30 moves to the cell formed by the HNB 21 without transferring the massage to the core network apparatus (S13). Specifically, the notification is carried out by using an RUA Direct Transfer (RANAP Relocation Required) message.

Next, the HNB 21 notifies the HNB-GW 10 that the HNB 21 has received the RUA Direct Transfer (RANAP Relocation Required) message (S14). Specifically, the notification is carried out by using an RUA Direct Transfer (RANAP Relocation Required ACK) message.

Next, similarly to the process in the step S12, the HNB-GW 10 notifies the HNB 20 that the HNB 21 to which the UE 30 is to move has permitted the transfer of the UE 30 without transferring the RUA massage to the core network apparatus (S16). Specifically, the notification is carried out by using an RUA Direct Transfer (RANAP Relocation Command) message.

Next, triggered by the acquirement of the RUA Direct Transfer (RANAP Relocation Command) message, the HNB 20 requests the UE 30 to move to the cell formed by the HNB 21. Specifically, the HNB 20 requests the UE 30 to establish a radio bearer between the UE 30 and the HNB 21 by using an RRC: Radio Bearer Reconfiguration message.

Figure 5:
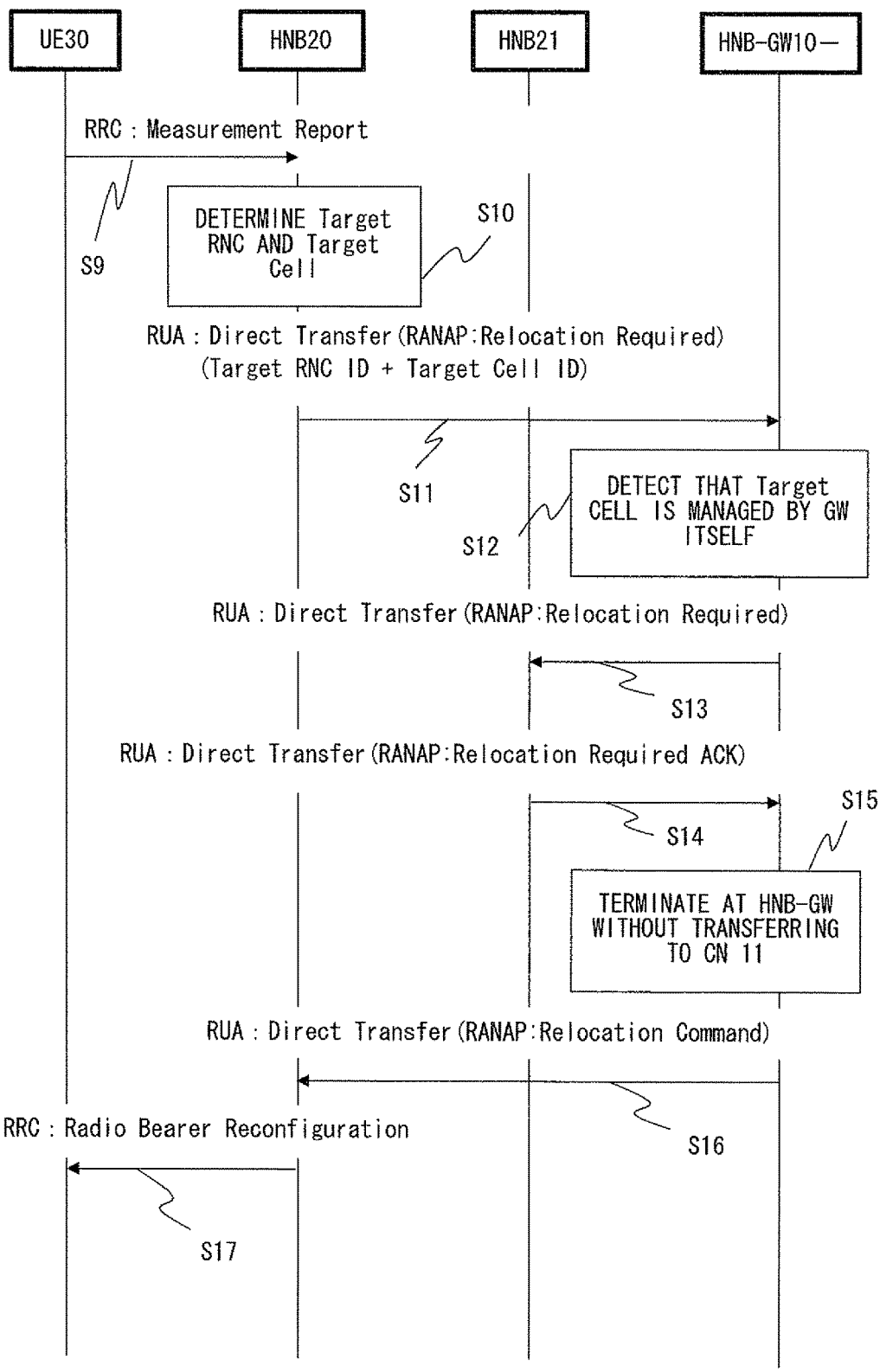
FIG. 5 shows a sequence with regard to a location change procedure of a mobile station according to a first exemplary embodiment.
Figure 6:
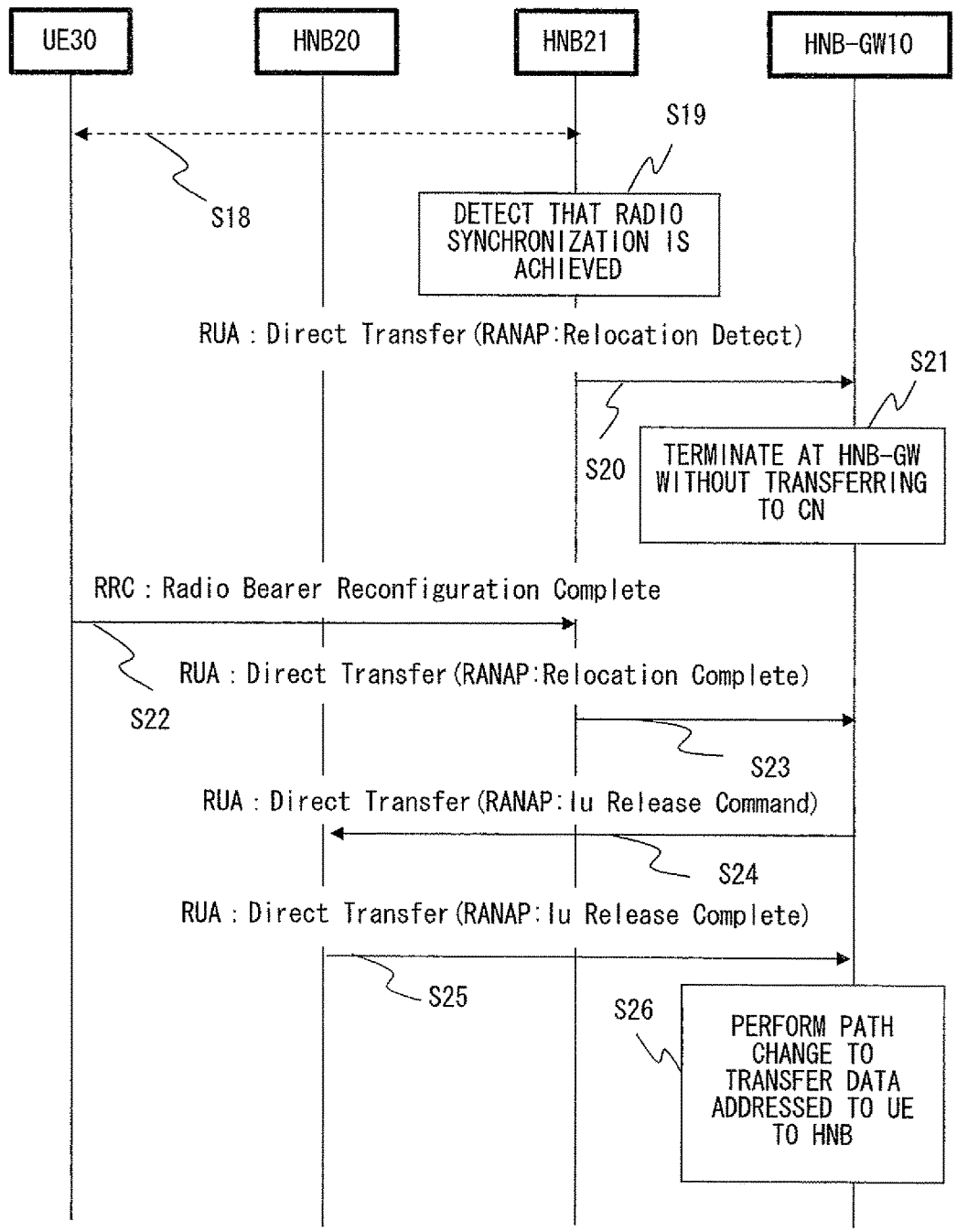
FIG. 6 shows a sequence with regard to a data transmission path change procedure according to a first exemplary embodiment.
Figure 7:
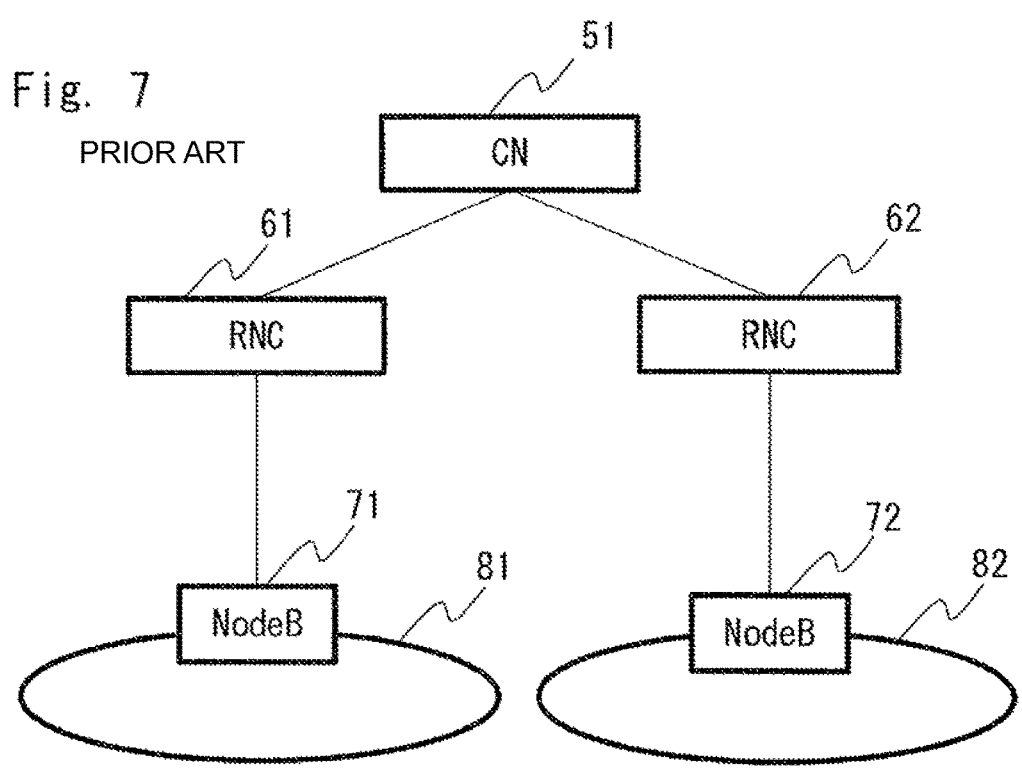
FIG. 7 is a system configuration diagram at the time when related-art relocation process is carried out.
Figure 8:
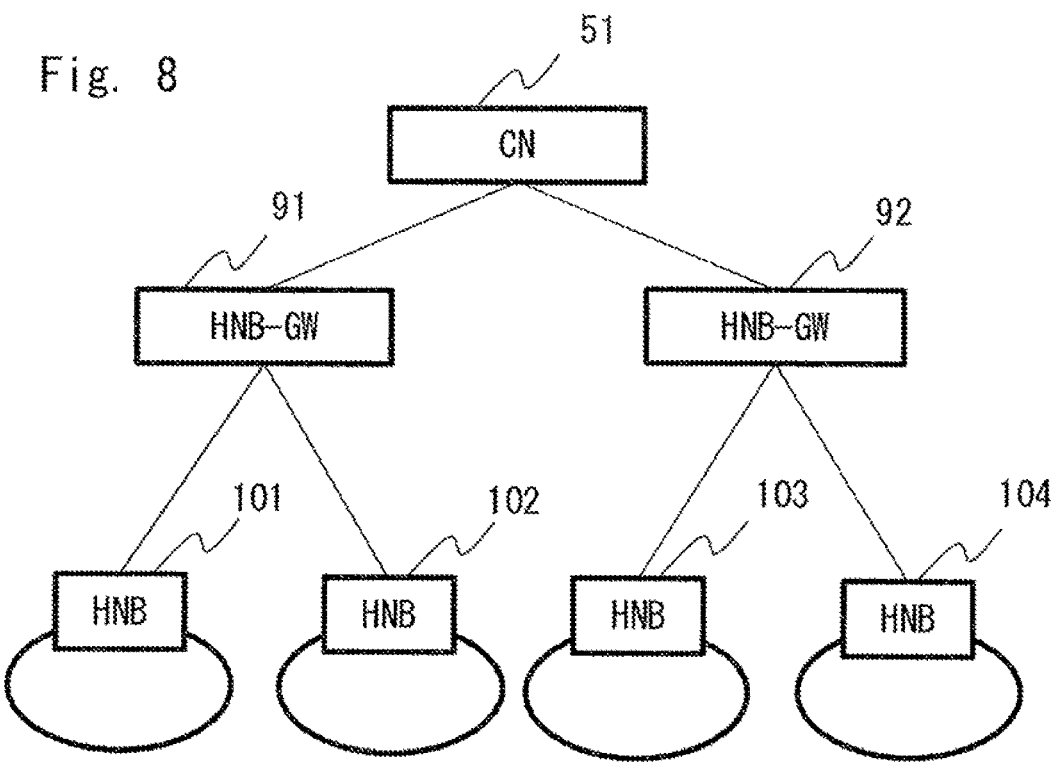
FIG. 8 is a system configuration diagram of a related-art femto cell system.

By carrying out the processes shown in FIG. 5, it is possible to request the UE 30 to establish a radio bearer between the UE 30 and the base station of the transfer destination cell without requiring any process performed in the core network apparatus.

Next, a procedure for connecting to the HNB 21 at the transfer destination of the UE is explained with reference to FIG. 6.

Firstly, the UE 30 establishes radio synchronization with the HNB 21 (S18). The radio synchronization between the UE 30 and the HNB 21 may be established by using a synchronization channel or the like transmitted from the HNB 21.

Next, the HNB 21 detects that the radio synchronization has been established between the UE 30 and the HNB 21 (S19). As for the establishment of the radio synchronization, for example, the bits of a pilot channel transmitted from the UE 30 to the HNB 21 are compared with the bits of a reference pilot channel possessed by the HNB 21. Then, the radio synchronization may be detected when unmatched bits are smaller than a specific threshold.

Next, the HNB 21 notifies the HNB-GW 10 that the transfer of the UE 30 has been detected (S20). Specifically, the notification is carried out by using an RUA Direct Transfer (RANAP Relocation Detect) message. Even in this case, since a relocation process is carried out at the time of the transfer between HNBs in a femto cell system, the HNB transmits an RUA message to transmit the message to the core network apparatus.

Next, since the transfer of the UE 30 is carried out under the HNB-GW 10, the HNB-GW 10 does not transfer the RUA message to the core network apparatus and the message is terminated at the HNB-GW (S21).

Next, the UE 30 notifies the HNB 21 that the transfer from the cell formed by the HNB 20 to the cell formed by the HNB 21 has been completed (S22). Specifically, the notification is carried out by using an RRC: Radio Bearer Reconfiguration Complete message. By doing so, it indicates that a radio bearer, which is a virtual connection between the UE 30 and the HNB 32, has been established. Therefore, it is possible to perform data transmission/reception after that.

Next, the HNB 21 notifies the HNB-GW 10 that the transfer of the UE 30 from the cell formed by the HNB 20 to the cell formed by the HNB 21 has been completed (S23). Specifically, the notification is carried out by using an RUA Direct Transfer (RANAP Relocation Complete).

Next, the HNB-GW 10 recognizes that the transfer of the UE 30 to the cell formed by the HNB 21 has been completed by the acquisition of the RUA Direct Transfer (RANAP Relocation Complete) message. As a result, the HNB-GW 10 performs the release process of the connection to the HNB 20 (S24). Specifically, since the HNB and the HNB-GW are connected through the Iu-h interface, the release process of the Iu-h connection is performed. At this point, the HNB-GW 10 notifies an RUA Direct Transfer (RANAP Iu Release Command) message to the HNB 20.

Next, after the HNB 20 obtains the RUA Direct Transfer (RANAP Iu Release Command) message, the HNB 20 notifies an RUA Direct Transfer (RANAP Iu Release Complete) message to the HNB-GW 10 (S25). As a result, the Iu-h connection between the HNB 20 and the HNB-GW is released.

Next, the HNB-GW 10 changes the path so that data addressed to the UE 30 is transferred to the HNB 21 (S26). The core network apparatus transmits the data addressed to the UE 30 to the HNB-GW 10 without giving any consideration to which of the cells formed by the HNBs 20 and 21 the UE 30 belongs to. Upon receiving the data addressed to the UE 30 from the core network apparatus, the HNB-GW 10 transmits the data to the UE 30 through the HN 21 to which the UE 30 has moved.

As has been explained above, in the relocation process performed when a mobile station moves between femto base stations, the use of the gateway apparatus according to the first exemplary embodiment of the present invention makes it possible to realize the mobility between femto base stations within the same HNB-GW by terminating the message at the HNB-GW and transmitting the message to the femto base station to which the mobile station has moved.

Further, it is also possible to realize the mobility by the relocation process even between cells using the same RNC-ID.

Further, the mobility between the femto base stations within the same HNB-GW can be implemented without making any modification to the core network apparatus.

Further, the femto base station can implement the mobility of the mobile station without giving any consideration to the network to which the mobile station moves. Note that examples of the network to which the mobile station moves include a macro cell, a femto cell managed by a different HNB-GW, and a femto cell managed by the same HNB-GW.

Other Exemplary Embodiments

In the case of a transfer between HNBs that are managed by the same HNB-GW, the mobility between the HNBs can be realized by providing the HNB-GW with means for transferring an RUA message to the core network apparatus and providing the core network apparatus with means for returning the message to the HNB-GW that has transmitted the RUA message.

In this way, the mobility between the femto base stations within the same HNB-GW can be implemented without making any modification to the HNB-GW.

Further, the determination whether the transfer destination cell is managed by the same HNB-GW or not is carried out based on the RNC-IDs on the adjacent cell list possessed by the femto base station. Furthermore, the mobility between HNBs is implemented by notifying a mobile station transfer request to the HNB-GW by using an HNBAP message that is terminated at the HNB-GW apparatus, instead of using an RUA message that is used for the purpose of transmitting a message to the core network apparatus.

In this way, the mobility between the femto base stations within the same HNB-GW can be implemented without making any modification to the HNB-GW.

Note that the present invention is not limited to the above-described exemplary embodiments, and various modifications can be made without departing from the spirit and scope of the present invention. Further, although the present invention is described as a hardware configuration in the above-described embodiments, the present invention is not limited to the hardware configurations. Any given process in the present invention can be also implemented by causing a CPU (Central Processing Unit) to execute a computer program. In the above-described example, the program can be stored by using various types of non-transitory computer readable media, and can be supplied to computers. Examples of the non-transitory computer readable media include various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

Although the present invention has been explained above with reference to certain exemplary embodiments, the present invention is not limited to the above-described exemplary embodiments. Various modifications that can be understood by those skilled in the art can be made to the configurations and the details of the present invention without departing from the scope of the present invention.

This application is based upon and claims the benefit of priority from Japanese patent application No. 2009-102034, filed on Apr. 20, 2009, the disclosure of which is incorporated herein in its entirety by reference.

REFERENCE SIGNS LIST 1, 2 BASE STATION
10 GATEWAY APPARATUS
11 RECEIVING UNIT
12 TRANSMITTING UNIT
13 IDENTIFIER DETERMINATION UNIT
14 IDENTIFIER ASSIGNMENT UNIT
15 CONNECTION CANCEL UNIT
16 PATH SETTING UNIT
20, 21 FEMTO BASE STATION
30 MOBILE STATION

The invention claimed is:

1. A method of Home Node B-Gateway (HNB-GW), comprising:
receiving, from a source Home Node B (HNB), a first Radio Access Network Application Part (RANAP) relocation message including parameters, the parameters comprising a Target Radio Network Controller (RNC) ID and a Target Cell ID,
constructing a second RANAP relocation message using the parameters,
determining a target HNB, and
transmitting the second RANAP relocation message to the target HNB,
the Target RNC ID received from the source HNB being same as a RNC ID allocated to the HNB-GW and,
the HNB-GW being identified towards a core network (CN) by the RNC ID and connected to the CN, the source HNB and the target HNB.

2. The method according to claim 1, further comprising:
receiving a third RANAP relocation message being an acknowledge (ACK) message of the second RANAP relocation message from the target HNB and
transmitting, to the source HNB, a fourth RANAP relocation message being a RANAP relocation command message, without transmitting the third RANAP relocation message to the CN.

3. The method according to claim 1, further comprising:
receiving from the source HNB a RANAP Iu Release Complete message.

4. The method according to claim 1, wherein
the first RANAP relocation message is a RANAP relocation required message and the HNB-GW transmits the RANAP relocation required message to the CN if the Target RNC ID received from the source HNB is different from the RNC ID allocated to the HNB-GW.

5. A Home Node B-Gateway (HNB-GW), comprising:
a receiver configured to receive, from a source Home Node B (HNB), a first Radio Access Network Application Part (RANAP) relocation message including parameters, the parameters comprising a Target Radio Network Controller (RNC) ID and a Target Cell ID,
a controller configured to construct a second RANAP relocation message using the parameters and determine a target HNB, and
a transmitter configured to transmit the second RANAP relocation message to the target HNB,
the Target RNC ID received from the source HNB being same as a RNC ID allocated to the HNB-GW and,
the HNB-GW being identified towards a core network (CN) by the RNC ID and connected to the CN, the source HNB and the target HNB.

6. The HNB-GW according to claim 5, wherein
the receiver receives a third RANAP relocation message being an acknowledge (ACK) message of the second RANAP relocation message from the target HNB and
the transmitter transmits, to the source HNB, a fourth RANAP relocation message being a RANAP relocation command message, without transmitting the third RANAP relocation message to the CN.

7. The HNB-GW according to claim 5, wherein
the receiver receives from the source HNB a RANAP Iu Release Complete message.

8. The HNB-GW according to claim 5, wherein
the first RANAP relocation message is a RANAP relocation required message and the HNB-GW transmits the RANAP relocation required message to the CN if the Target RNC ID received from the source HNB is different from the RNC ID allocated to the HNB-GW.

9. A mobile communication system comprising:
a source HNB configured to transmit, to the HNB-GW, a first Radio Access Network Application Part (RANAP) relocation message including parameters, the parameters comprising a Target Radio Network Controller (RNC) ID and a Target Cell ID,
a HNB-GW configured to construct a second RANAP relocation message using the parameters, determine a target HNB, and transmit the second RANAP relocation message to the target HNB,
a target HNB configured to receive the second RANAP relocation message,
the Target RNC ID received from the source HNB being same as a RNC ID allocated to the HNB-GW and,
the HNB-GW being identified towards a core network (CN) by the RNC ID and connected to the CN, the source HNB and the target HNB.

10. The mobile communication system according to claim 9, wherein
the HNB-GW receives a third RANAP relocation message being an acknowledge (ACK) message of the second RANAP relocation message from the target HNB, and transmits, to the source HNB, a fourth RANAP relocation message being a RANAP relocation command message, without transmitting the third RANAP relocation message to the CN.

11. The mobile communication system according to claim 9, wherein
the HNB-GW receives from the source HNB a RANAP Iu Release Complete message.

12. The mobile communication system according to claim 9, wherein
the first RANAP relocation message is a RANAP relocation required message and the HNB-GW transmits the RANAP relocation required message to the CN if the Target RNC ID received from the source HNB is different from the RNC ID allocated to the HNB-GW.

* * * * *